United States Patent [19]

Wittke

[11] Patent Number: 4,682,511
[45] Date of Patent: Jul. 28, 1987

[54] GEAR ASSISTED CONTINUOUSLY VARIABLE TRANSMISSION

[76] Inventor: Ernest C. Wittke, 585 Bloomfield Ave., Apt. 40, W. Caldwell, N.J. 07006

[21] Appl. No.: 788,869

[22] Filed: Oct. 18, 1985

[51] Int. Cl.⁴ .............................................. F16H 37/06
[52] U.S. Cl. ...................................... 74/681; 74/689; 74/690; 474/76
[58] Field of Search ................. 74/674, 681, 689, 690, 74/691; 474/76

[56] References Cited

U.S. PATENT DOCUMENTS

| | | | |
|---|---|---|---|
| 625,111 | 5/1899 | Lane et al. | 474/76 |
| 628,585 | 7/1899 | Lane et al. | 474/76 |
| 2,233,967 | 3/1941 | Wellton | 74/690 |
| 2,446,462 | 8/1948 | Dodge | 74/691 X |
| 2,716,357 | 8/1955 | Rennerfelt | 74/691 |
| 2,736,467 | 2/1956 | Durand | 474/76 X |
| 2,889,716 | 6/1959 | Doty | 74/689 |
| 3,340,749 | 9/1967 | Magg et al. | 74/689 |
| 3,442,346 | 5/1969 | Winter et al. | 74/689 X |
| 3,527,119 | 9/1970 | Nasvytis | 74/681 |
| 3,822,610 | 7/1974 | Erban | 74/691 |
| 4,382,188 | 5/1983 | Cronin | 74/690 X |
| 4,553,450 | 11/1985 | Gizard | 74/689 |
| 4,587,866 | 5/1986 | Kraus | 74/690 X |

FOREIGN PATENT DOCUMENTS 2108599 5/1983 United Kingdom .................. 74/691

*Primary Examiner*—Leslie Braun
*Assistant Examiner*—Dwight G. Diehl
*Attorney, Agent, or Firm*—Edward R. Weingram

[57] ABSTRACT

A CVT combined with a gearshift mechanism to permit shifting of power flow under conditions of zero load and synchronous speed. The CVT can adjust the output speed within a gear ratio without resetting of the CVT ratio during a shift. The full speed range of the CVT is matched by two planetary drivetrains having normal and inverted characteristics and driven by two shifting gearboxes. Input power is divided into three paths to drive a central CVT and the two shifting gearboxes. The output of one of the gear-boxes is clutched to the normal input of a compound planetary drivetrain and the output of the other gearbox is clutched to the inverted input of the compound planetary. The CVT is coupled to the sun gear input of the compound planetary with the output of the compound planetary providing the output of the gear-assisted CVT. Operation occurs with either of the two clutches engaged to a respective input but not both, so that each gearbox may be shifted when its output is disengaged. Continuous operation from full forward through zero to full reverse is achieved. A control mechanism is provided to attain the necessary synchronization of clutches and gearshifts for proper operation. The gearbox reduces the capacity requirements and energy losses of the CVT for a given overall output. The result is a transmission that utilizes the benefits of the CVT over the full speed range in which losses are reduced and capacity increased by the number of gear steps.

10 Claims, 9 Drawing Figures

GEAR ASSISTED CONTINUOUSLY VARIABLE TRANSMISSION

BACKGROUND OF THE INVENTION

1. Field of the Invention

The present invention relates to variable speed transmissions and particularly to an improved transmission which employs a known type of continuously variable transmission in combination with a shifting gearbox to provide increased efficiency and power handling capabilities over a full speed range.

2. Description of the Prior Art

Presently available continuously variable transmissions have the ability to vary speed ratios in infinitesimal steps over a wide range of speeds to permit automotive engines to be operated at the most efficient speed for the load conditions and to be rapidly and smoothly shifted to a ratio that allows maximum engine power when required. However, use of the CVT has been severely limited by poor power handling capacity and relatively low efficiency of the CVT which negates most of the advantages in improving the operating efficiency of automotive engines. For high power ratings required for automotive applications, three types of CVTs are available. These are the hydrostatic, the flat belt, and the traction types.

The hydrostatic CVT, such as those manufactured by the Eaton Corporation, designated as Eaton Hydrostatic Transmissions Model 33 through Model 76, consist of a variable displacement hydraulic pump driving a fixed displacement hydraulic motor. These are commercially available in capacities up to 200 HP for use on heavy construction equipment and provide full load operating efficiencies of over 85%. The speed ratio is continuously variable from full forward to full reverse. The generally large size requirements and cost make this type unsuitable for automotive applications.

The flat belt type of CVT, such as one developed in Holland by van Doorne Transmissie, and utilized experimentally by Fiat, Renault and Ford automobiles, is similar to a conventional V-belt drive except that the belt is made wide so that the faces of the pulleys on which it rides can be moved together or apart. Moving the faces of one pulley together and the faces of the other pulley apart causes the belt to ride at a larger radius on the first pulley and at a smaller radius on the second pulley causing the speed ratio between the first and second pulleys to increase. This type of transmission is capable of operating at speed ratios in excess of 4:1, but with no reversal capability. It has been applied to low powered automobiles at ratings of up to 50 HP with efficiencies reported to approach 90%.

The traction type of transmission, such as described in U.S. Pat. No. 3,822,610 by Erban, typically consists of hardened steel rollers operating against a pair of toroidal discs. An extremely high contact force allows the rollers to transmit considerable power without slippage. Tilting the rollers changes the drive ratio between the discs. The device is capable of an efficiency of over 98% at full forward and 80% in full reverse with power ratings of several hundred horsepower being possible. However, the high cost of the required high strength materials limit its applicability. Thus, all of the known CVTs have operational, efficiency, cost and size disadvantages which limit use for general automotive applications.

One known example of an attempt to improve the use of a CVT by combining it with a gear mechanism is found in U.S. Pat. No. 3,527,119. This device, however, utilizes a unidirectional variable speed motor which can be selectively coupled to one of two plural paths to control the relative speeds. Each path can be stopped separately to achieve shifting without requiring braking but cannot be shifted under load. The variable speed drive is non-reversible and the device has only limited use for automotive applications.

SUMMARY OF THE INVENTION

It is therefore the primary object of the present invention to provide an improved transmission which enables a continuously variable transmission to be utilized more efficiently and with greater power capabilities for automotive applications.

It is another object of the invention to permit use of a CVT over a full speed range with reduced losses and increased capacity.

It is a further object of the invention to combine a CVT with a stepped ratio changing mechanism to permit the ratio changing mechanism to transmit the bulk of the power with the CVT transmitting only the incremental power between ratios.

Another object of this invention is to combine a CVT with a stepped ratio changing mechanism so as to permit shifting of ratio under zero load conditions.

A still further object of the invention is to insure that all power transfer operations occur between shafts rotating at the same speeds.

An added object of the invention is to insure that changing of the ratio of the stepped ratio changing mechanism does not require a change in the CVT ratio.

A further object of the invention is to insure that operation of the transmission over the entire speed range does not require an interruption of power flow.

It is an additional object of the invention to provide a gear-assisted CVT of reduced size and cost.

These objects are achieved with the combination of a continuously variable transmission and a compound planetary mechanism having normal and inverted characteristics and driven by two shifting gearboxes. Input power is divided into three paths including a central CVT and the two shifting gearboxes. Two clutches couple the gearboxes to the respective normal and inverted inputs of the compound planetary. The output of the CVT is coupled to the sun gear input of the compound planetary and the output of the compound planetary is the output of the gear-assisted CVT. Only one of the two clutches can be engaged at one time to a respective input to permit each gearbox to be shifted when its output is disengaged. Gear shifts occur under zero load and power transfers occur under synchronous speed conditions without need to reset the CVT. A control mechanism provides the required synchronized action of clutches and gear shifts for proper operation. Continuous operation over the full speed range from full forward through zero to full reverse is obtained. Other objects and advantages will become apparent from the following description in conjunction with the accompanying drawings.

DESCRIPTION OF THE PREFERRED EMBODIMENTS

One of the key elements in the gear assisted continuously variable transmission is the planetary mechanism. This is a well known mechanism used in automatic transmissions in its spur gear form and in differentials in its bevel gear form. In the traction type CVT, the planetary mechanism is commonly employed using rollers instead of gears. In the present case, for explanatory purposes, the planetary mechanism will be considered to be a three-shaft device in which the angular velocities of the three shafts obey the law:

$$W_A + (M-1)W_B = MW_C \quad \text{Equation 1},$$

where:
 $W_A$ = angular velocity of shaft A,
 $W_B$ = angular velocity of shaft B,
 $W_C$ = angular velocity of shaft C, and
 M is the planetary ratio, defined with shaft B stationary, as:
 $M = WA/WC$.

When $(M-1)$ is positive, the planetary is defined as being of the normal configuration, and when $(M-1)$ is negative, the planetary is defined as being of the inverted configuration.

Figure 1A:
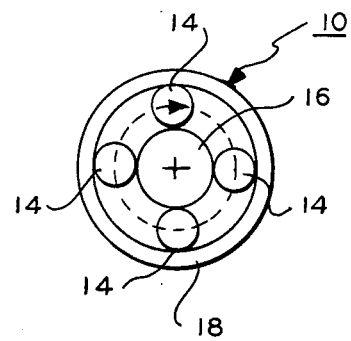
FIGS. 1a and 1b are front and partially sectioned side schematic views of a normal planetary mechanism.
Figure 1B:
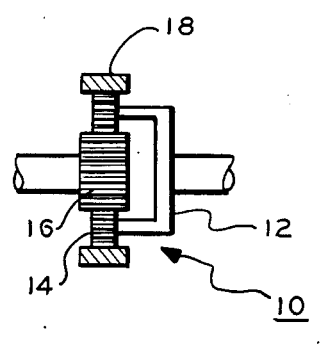
Figure 2A:
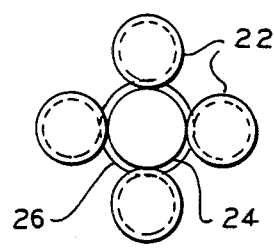
FIGS. 2a and 2b are front and side schematic views of an inverted planetary mechanism.
Figure 2B:
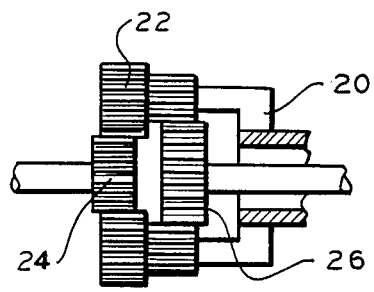

In order to implement these configurations, the requirements of the Equation 1 are met by three possible arrangements each having their own planetary ratios N, to be defined in terms of M, as indicated below. As shown in FIGS. 1a and 1b, a typical spur gear planetary mechanism 10 of the normal configuration is illustrated. In this form, with the planet carrier 12 stationary and planet gears 14 rotatable in position on the ends of the carrier, the sun gear 16 and the ring gear 18 rotate in opposite directions, and the value of N−1 is positive. Conversely, for the inverted configuration, as shown in FIGS. 2a and 2b, with the planet carrier 20 stationary and planet gears 22 rotatable in position, the sun gear 24 rotates in the same direction as ring gear 26 and the value of N−1 is negative. In both cases $N = W_{sun}/W_{planet}$.

The three possible configurations for the planetary drivetrains are obtained by connecting the planet carrier to shafts A, B or C of Equation 1. For each of these connections there exists a value of N for the actual mechanism that satisfies the equation for the value of M required as listed in the following table.

TABLE 1

| Planet Carrier | Sun Gear | Ring Gear | Ratio N |
|---|---|---|---|
| Shaft A | Shaft C | Shaft B | 1/M |
| Shaft B | Shaft A | Shaft C | −(M + 1) |

TABLE 1-continued

| Planet Carrier | Sun Gear | Ring Gear | Ratio N |
|---|---|---|---|
| Shaft C | Shaft A | Shaft B | M |

If the ratio N is greater than 1, the actual planetary train is of the normal configuration and if the ratio N is less than 1, the device is of the inverted form. If the magnitude of N is less than 2, the shaft connections to the sun and ring gears provided by the table are interchanged. While only spur gears have been illustrated, the same relationships apply to all types of planetary configurations such as bevel gears and rollers.

As will be shown, implementation of the gear assisted CVT requires the use of two opposite type planetary mechanisms By defining the mechanism requirements in terms of Equation 1 and the actual mechanism in terms of a transformed planetary ratio N, the implementation of the gear-assisted CVT can be described in one generic configuration. Otherwise, it would be necessary to describe nine variations for each of the many types of planetary arrangements such as spur gears, bevel gears, or rollers, etc.

The second key element in the gear assisted CVT is the ratio changing mechanism and clutch. The function of this combination is to engage and disengage the input and output shafts at a ratio which is selected from one or more fixed predetermined ratios, one of which may be unity, as required by the design equations to be provided hereinafter. Examples of suitable ratio changing mechanisms and clutches include the clutch and gearbox of a conventional manually shifted automotive transmission and the clutch operated planetary shifting mechanism of a conventional automatic automobile transmission. For purposes of illustration, however, the function will be shown as performed by a conventional manually shifted automobile transmission with a separate clutching mechanism.

To illustrate a simple but impractical approach to achieve a gear-assisted CVT, a conventional manual automotive transmission could be combined with a CVT to obtain a full range transmission with the CVT acting to fill in the steps between gear ranges. Such an application would locate the CVT between the clutch and gearbox of the transmission. Upon starting the vehicle, the clutch would be disengaged with the CVT at its minimum ratio and the gearbox at its lowest ratio. The clutch would then be engaged and the ratio of the CVT increased. When the CVT reached the maximum ratio, the clutch would be disengaged, the gearbox upshifted, the CVT returned to the minimum ratio, and the clutch reengaged. This process would be repeated until the highest gear ratio was attained. This approach, however, has inherent difficulties. One is the fact that during the time that the CVT is being reset to the minimum ratio, the clutch must be disengaged and no power would be transmitted. Such interruption of power could not be tolerated for automotive or most other uses. The second problem occurs from the overall speed ratio of an automotive transmission being in the order of four to one and being divided into three to five ratios. The speed ratio of a typical CVT is at least as great. In order to apply the CVT to the gearbox, the speed range of the CVT must approximately match the ratio between the steps of the gearbox.

The required matching of the CVT range to the gearbox can be accomplished with the use of a planetary mechanism. The output of the CVT would be coupled to one shaft of a planetary mechanism and the second shaft coupled to the input of the CVT. Summing the output of the CVT with the input of the CVT allows the output speed ratio at the planetary mechanism output shaft to be modified by the planetary ratio. This changes the effective range of the CVT, with the torque load reduced in proportion to the reduction in range. The required planetary ratio in terms of Equation 1 is:

$$M=(T-t)/DE;\qquad \text{Equation 2.}$$

where;

T=CVT ratio at maximum planetary output speed,
t=CVT ratio at minimum planetary output speed,
E=Ratio of maximum planetary output speed to input speed,
D=Maximum output speed change/maximum output speed.

The interruption of power during shifting caused by the need to reset the ratio of the CVT can be eliminated by arranging the gearing to cause the sense of the overall transmission ratio with respect to the sense of the CVT ratio to reverse on alternate shift positions. This would occur, for example, if the overall transmission ratio increased as the CVT ratio decreased in first and third gear and if the overall ratio increased as the CVT ratio increased in second and fourth gear. (Gear numbers are used as those of manually controlled automotive transmissions). Reversing the sense between the CVT ratio and overall transmission ratio on alternate gear ratios eliminates the need to change the ratio of the CVT during a shift. By proper selection of ratios for the gear ranges, shifts can be made synchronously with power flow shifted from one shaft to another turning at the same speed. Power shifting can thus be made rapidly under continuous load without shock.

Typically, the operation of such a transmission from its minimum ratio, which may be reverse or standstill, to its maximum forward ratio would be accomplished by decreasing the CVT ratio from maximum to minimum in first gear, shifting to second gear, increasing the CVT ratio to maximum, shifting to third gear, decreasing the CVT ratio to a minimum, shifting to a fourth gear and increasing the CVT ratio to a maximum. The system could also be arranged so that the changes of the CVT ratio from minimum to maximum occurred in first and third gear and the changes of CVT ratio from maximum to minimum occurred in second and fourth gear.

In order to provide a practical transmission utilizing a ratio shifting mechanism such as a gearbox to enhance the cappabilities of a CVT, the above results must be achieved without large amounts of circulating power. This can be accomplished with a full range CVT without ratio reduction by use of two planetary gearsets having normal and inverted characteristics and driven by two shifting gearboxes.

The characteristics of the planetary mechanism defined by Equation 1 are such that, if shaft B is driven at a constant angular velocity, the angular velocity of shaft C of a normal (M greater than unity) planetary mechanism will become more positive when the angular velocity of shaft A is made more positive. Conversely, if shaft B is driven at a constant angular velocity, the angular velocity of an inverted (M less than unity) planetary mechanism will become more positive when the angular velocity of shaft A is made more negative. By applying the output of a CVT to shaft A of a normal planetary mechanism, such as shaft 16 shown in FIGS. 1a and 1b, and to shaft A of an inverted planetary mechanism, such as shaft 24 shown in FIGS. 2a and 2b, and by connecting shaft C, or 12, of the normal planetary mechanism and shaft C, or 20, of the inverted planetary mechanism to the overall output, an ideal gear assisted CVT can be made.

Figure 3:
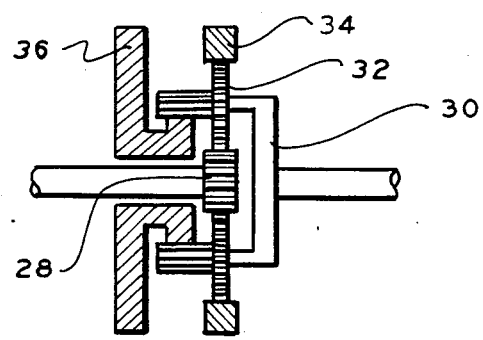
FIG. 3 is a partially sectioned side schematic view of a compound planetary mechanism.

Since the gear assisted CVT requires the characteristics of both the normal and inverted planetary mechanisms and couples two shafts of one mechanism to two shafts of the other mechanism, these can be economically combined to provide a compound mechanism which is the equivalent of two separate mechanisms coupled together. One embodiment of such a compound planetary mechanism is shown in FIG. 3. In this configuration, the sun gear 28 is shaft A of both planetary mechanisms and the planetary carrier 30 is shaft C of both planetary mechanisms, as defined by Equation 1. The normal input portion includes dual radius planet gears 32 and ring gear 34, while the inverted portion includes ring or second sun gear 36. Since, as shown in the above table, there are three configurations of a planetary gearset that can be used to meet the requirements of each planetary mechanism, and there are six arrangements of an inverted planetary, there are eighteen possible configurations for the compound planetary mechanism that are conceptually valid and included in this disclosure. A limited number of these in which the CVT drives one or both planetary carriers may be impractical since, if the magnitude of M is close to unity, they will produce high gearing losses in the planetary gearset. In the compound planetary shown, with the planet carrier 30 stationary, ring or second sun gear 36 of the inverted planetary rotates in the same direction as the sun gear 28, and ring gear 34 of the normal planetary rotates in the opposite direction to the sun gear. The compound set provides two values of M. The value of M for the normal planetary is greater than +1 while the value of M for the inverted form is less than +1.

Figure 4:
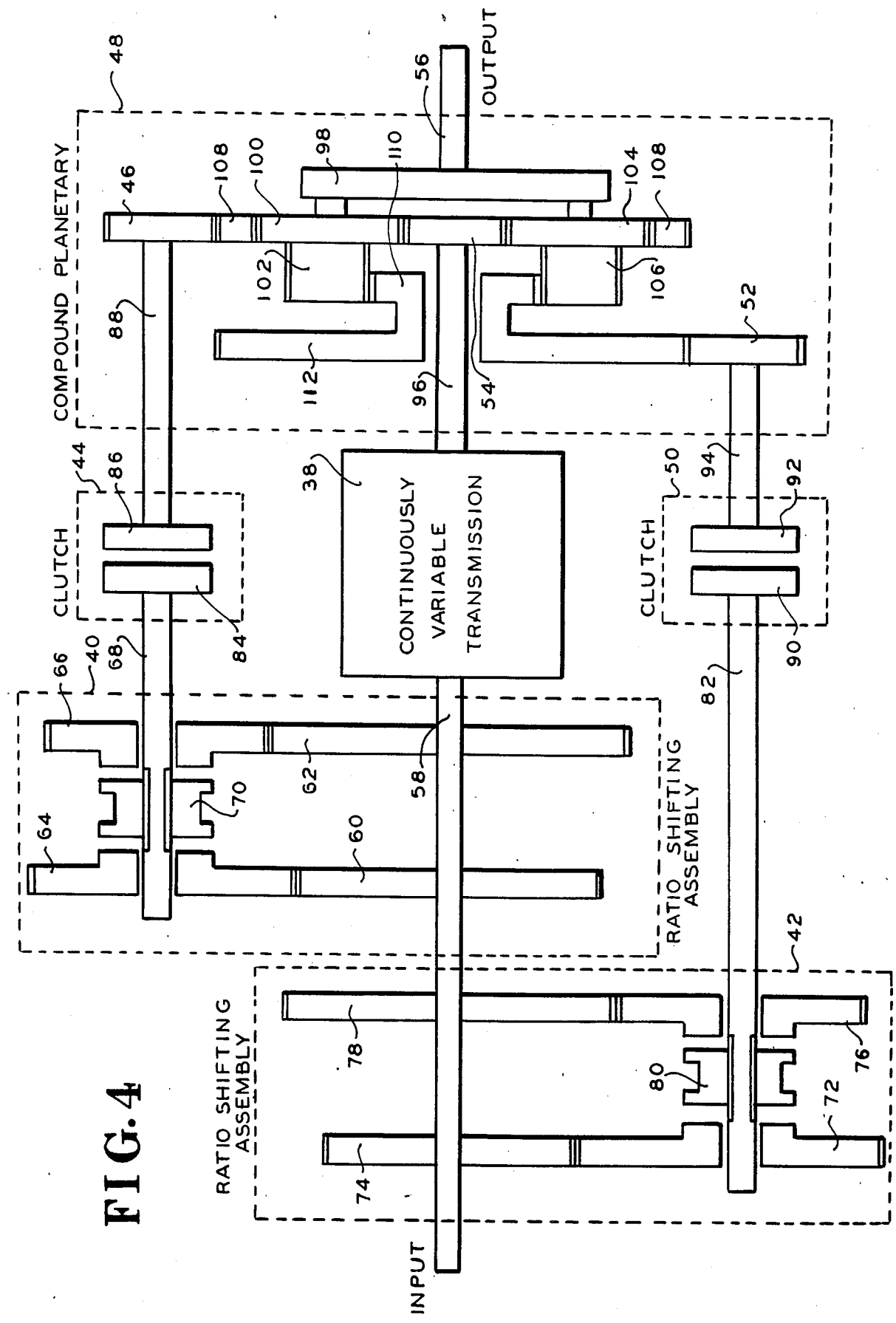
FIG. 4 is a schematic side view of a gear-assisted continuously variable transmission system of the present invention.

The complete system is illustrated schematically in FIG. 4. In this arrangement, the input power is divided into three paths to drive the central CVT 38 and two ratio changing mechanisms or gearboxes 40, 42. The sum of the number of gearshift speed ratios of each box is equal to the total number of gearshift speed ratios for the system as a whole. While two ratios are illustrated for each gearbox, the number of gear ratios available in one gearbox can be equal to or one larger than the number of ratios available in the other gearbox depending upon whether the total number of gearshift ratios in the system is to be odd or even. The output of one of the gearboxes 40 is coupled by clutch 44 to the normal ring gear drive input 46 of the four shaft differential assembly or compound planetary 48 and the output of the other gearbox 42 is coupled by clutch 50 to the inverted ring gear drive input 52. Input gear 46 may be considered as input A and input gear 52 as input B of the compound planetary. Inputs A and B refer to shaft B of Equation 1 for the normal and inverted planetary gearsets respectively. The CVT 38 is connected to the sun gear input 54 of the compound planetary corresponding to shaft A of Equation 1 for both an inverted and normal planetary. The output 56 of the compound planetary corresponds to shaft C of Equation 1 for both a normal and inverted planetary gearset and provides the output of the overall gear-assisted CVT. Since operation occurs with either clutch 44 or clutch 50 engaged, but not both, each gearbox may be shifted when its output is disengaged. The automotive type synchromesh gearshift mechanism is entirely suitable for the shifting gearboxes. The clutches may be located at the input to each gearbox instead of at the output as shown. Since engagement and disengagement of the clutches will be under synchronous speed conditions, a simple dog clutch may be used. In practice, a multiple disc type of clutch may be more desirable. The functional blocks shown in FIG. 4, including the CVT, the two shifting gearboxes and clutches, and the compound planetary are each illustrated in a representative form that is conventional in the automotive art.

The continuously variable transmission may be any of the available hydrostatic, traction or belt types as previously discussed, which have the requisite power handling capabilities and can transmit power in either direction at the angular velocity ratio determined by the input command. The ratio range of the CVT is not critical since all the currently available types can readily be accommodated by appropriate choice of gear ratios in the gear shift assemblies and compound planetary device in accordance with Equation 1. It is required, however, that the angular velocity ratio of the CVT be infinitesimally variable in response to command. The input to the CVT 38 is through shaft 58 which is driven by the prime mover such as an automotive engine (not shown). The ratio shifting assemblies 40, 42 are two speed gearshifting devices of suitable automotive types. In assembly 40, gears 60 and 62 rotate with shaft 58 and are driven by the prime mover. Gear 64 continually meshes with gear 60 and gear 66 continually meshes with gear 62, causing gears 64 and 66, which are free to rotate on shaft 68, to rotate at the appropriate angular velocities with respect to input shaft 58. Slider 70 is splined to shaft 68 and rotates with it. The side faces of slider 70 and gears 64, 66 are toothed and act as jaw clutches. These clutches will normally be of the automotive synchromesh type. With slider 70 to the left, gear 64 causes slider 70 to rotate at the same velocity as gear 64, while when slider 70 is to the right, it rotates with the same velocity as gear 66. Shaft 68 which rotates with slider 70 is thus caused to rotate at a selected speed ratio with respect to input shaft 58.

The operation of ratio assembly 42 is the same as that of assembly 40, with gear 72 being analogous to gear 64, gear 74 is analogous to gear 60, gear 76 is analogous to gear 66, gear 78 is analogous to gear 62, slider 80 is analogous to slider 70 and shaft 82 is analogous to shaft 68. Shaft 82 is thus caused to rotate at selected ratios with respect to shaft 58. Clutch assembly 44 includes faceplate 84 driven by shaft 68 and faceplate 86 which drives shaft 88. Clutch assembly 50 includes faceplate 90 driven by shaft 82 and faceplate 92 driving shaft 94. These clutches would normally be of the friction type, such as a multiple disc, but may also be of the jaw type since they engage with or disengage from shafts that are rotating at the same velocity. While ratio shifting assemblies 40, 42 with clutches 44, 50 are shown as synchronous mesh type shifting gear boxes with external clutches as normally employed in manually operated automotive transmissions, other known types are feasible. It is only required that the gear shift and clutch assemblies be capable of engaging the respective input and output shafts at a predetermined ratio and to disengage the shafts. Both gear shifting assemblies may have one or more ratios with the number of ratios of assembly 42 not being more than 1 greater or 1 less than that of assembly 40.

The four shaft differential assembly or compound planetary 48 includes two planetary gear assemblies having common elements. Gear 54 driven by shaft 96 is the sun gear of both planetary gearsets. Planet carrier 98 is common to both gearsets and drives output shaft 56. Gear 100, 102 is a single compound planetary gear, with gear 102 having a smaller diameter, which rotates as a unit and is supported by planet carrier 98, as is compound planetary gear 104, 106. Gear 108 is the ring gear of one planetary gearset and is coupled to gears 100, 104 by its internal teeth. External teeth on gear 108 couple it to drive gear 46 which rotates with and is driven by shaft 88. Gear 110 is the ring or second sun gear of the second planetary gearset, which is in mesh with planet gears 102, 106 and is driven by gear 112. Gear 112 is driven by gear 52 mounted on shaft 94.

The compound planetary arrangement of FIG. 4 is only one example of the many forms that can meet the ratio requirements of the invention. Each of the two planetary gearsets of the compound four shaft differential mechanism may take three different configurations. The CVT may be connected to the planetary, the clutch may connect to the planetary, or the output may be connected to the planetary, providing the proper gear ratios are selected. One of the planetary types can also be used in two subsets. In addition, the two planetaries may be combined into one device as shown or be separate mechanisms with one input shaft of each coupled together and the output shafts coupled together. The two planetaries may be fabricated of spur gears, bevel gears, or traction rollers. The particular requirements are that fixed and shaft 94 free to rotate, shaft 96 should turn at $M_A$ times the angular velocity of shaft 56, and if shaft 88 was free and shaft 94 was fixed, shaft 96 should turn at $M_B$ times as rapidly as shaft 56, and $M_A$ and $M_B$ should be of opposite sign as in the following design equations.

In designing the Gearshift Assisted Continuously Variable Transmission, the preferred ratios for the planetary devices and the gearboxes are determined as follows. Defining:

E = rotation rate of GACVT output at maximum forward velocity divided by angular velocity of input to GACVT T = ratio of CVT at maximum forward velocity of GACVT output possible with clutch A engaged t = ratio of CVT at opposite end of its speed range from ratio T K = gear ratio between CVT output and sun gear input of compound planetary gearset (normally equal to unity)

$A_I$ = ratio of I'th step of gearbox A $B_J$ = ratio of J'th step of gearbox B $D_A$ = velocity change of GACVT possible with clutch A engaged divided by maximum positive output velocity $D_B$ = velocity change of GACVT possible with clutch B engaged divided by maximum possible output velocity $M_A$ = planetary ratio of input A of compound planetary mechanism as defined by M of Equation 1

$M_B$ = planetary ratio of input B of compound planetary mechanism as defined by M of Equation 1

I = shift state of gearbox A (positive integer)

J = shift state of gearbox B (positive integer)

$I_M$ = number of shift states of gearbox A $J_M$ = number of shift states of gearbox B
$L$ = GACVT polarity, equal to one if maximum positive output of GACVT occurs with clutch A engaged, equal to zero if maximum positive output of GACVT occurs with clutch B engaged Where:

$I_M \geq J_M$ if $L = 1$; $I_M < J_M$ if $L = 0$ $I$ and $J$ are equal to 1 at maximum output ratio.

Then:

$$M_A = (K(T - t)/D_A E) \qquad \text{Equation 3}$$

$$M_B = (K(t - T)/D_B E) \qquad \text{Equation 4}$$

$$A_I = \frac{KE(T(1 - ID_A - (I - L)D_B) - t(1 - (I - 1)D_A - (I - L)D_B))}{K(T - t - D_A E)} \qquad \text{Equation 5}$$

$$B_J = \frac{KE(T(1 - (J + L - 1)D_A - (J - 1)D_B) - t(1 - (J + L - 1)D_A - JD_B))}{K(T - t) + D_B E} \qquad \text{Equation 6}$$

While, in principle, there is no need for the ratios $D_A$ and $D_B$ to be equal, in practice, the more nearly they are equal, the more satisfactory the operation of the GACVT might be expected to be to the user since an equality implies equal ratio changes in the A and B ranges. In addition, the effectiveness of the CVT will be optimized since the load torque on the CVT will be equal in both ranges. A design in which $D_A$ and $D_B$ are equal would thus seem to be the preferred design. We may write:

$$I_M D_A + J_M D_B = \qquad \text{Equation 7}$$

$$\frac{\text{Maximum Forward Output} - \text{Minimum Forward Output}}{\text{Maximum Forward Output}}$$

Or, for $D_A = D_B = D$:

$$D = \qquad \text{Equation 8}$$

$$\frac{\text{Maximum Forward Output} - \text{Minimum Forward Output}}{(I_M + J_M) \times \text{Maximum Forward Output}}$$

Since the number of gearsteps is equal to $I_M$ plus $J_M$.

The operation of the gear assisted CVT transmission can be described by considering its operation from the most positive ratio or maximum forward speed to the most negative ratio or reverse. Slider 70 will be considered as engaging gear 66 to provide a higher ratio for gear shift assembly 40, slider 80 is in engagement with gear 76 to provide a higher ratio for assembly 42, clutch 44 is engaged, clutch 50 is disengaged, and the CVT is at its most positive ratio. Under these conditions, the output rotation rate of the CVT will be added to the rotation rate of shaft 88 in proportion to the planetary ratio between the shafts to provide the maximum positive output velocity of shaft 56. Adjusting the CVT to produce a less positive rotation rate of shaft 96 will cause the rotation rate of shaft 56 to become less positive. With the correct choice of gear ratios, adjusting the CVT to produce the most negative rate of shaft 96 causes the rotation rate of shaft 94 to be reduced to the same rate as shaft 82. Since shafts 82 and 94 are rotating at the same rate, clutch 50 may be engaged without shock or slippage. With clutch 50 engaged, clutch 44 may be disengaged, without shock or slippage, since shafts 88 and 68 will be rotating at the same velocity due to the rotation of shafts 96 and 94.

In this position, the output rotation rate of the CVT shaft 96 is subtracted from the rotation rate of shaft 94 in proportion to the planetary ratio between the shafts. Adjusting the CVT to produce a more positive output causes the rotation rate of shaft 56 to again become less positive. As the output of the CVT is made more positive, slider 70 is moved to engage gear 64 to provide a less positive rotation rate for shaft 68. When the CVT reaches its most positive output rate, shafts 68 and 88 will again be rotating at the same rate with the correct gear ratio provided. Clutch 44 may then be reengaged without shock or slippage and clutch 50 may be disengaged without shock or slippage since shafts 82 and 94 will be rotating in synchronism as a result of the rotations of shafts 96 and 88.

With clutch 44 engaged, the output rate of the CVT will again be added to the rate of shaft 88. As the output of the CVT becomes more negative, the rotation rate of shaft 56 becomes less positive. Slider 80 is moved to engage gear 72 of gear shift assembly 42 causing shaft 82 to rotate at a less positive rate. When the output rate of the CVT reaches its most negative rate, shafts 82 and 94 will again rotate at the same rate, permitting clutch 50 to engage without shock or slippage. Clutch 44 is then disengaged without shock or slippage since shafts 94 and 96 cause shafts 88 and 68 to rotate at the same rate. With clutch 50 engaged, the rotation rate of shaft 96 will again be subtracted from that of shaft 94 so that causing the output of the CVT to become more positive will again cause the rotation rate of the output shaft to become more negative. When the CVT output reaches its most positive rate, the output rate of shaft 56 will have achieved its most negative or least positive value.

With the selection of appropriate gear ratios, the operation of the gear assisted CVT will be continuous from its most positive to its least positive ratio, which may be a reverse direction. In that case, the transmission will be capable of operating at zero ratio, permitting a vehicle, for example, to be stationary with the transmission engaged. Increasing the output velocity is achieved by reversing the above procedure. All gear shifts will occur under zero load and all power transfers occur synchronously without need to reset the CVT. Recirculating power is limited to the power transmitted by the CVT, which is a small portion of the total power possible.

Figure 5:
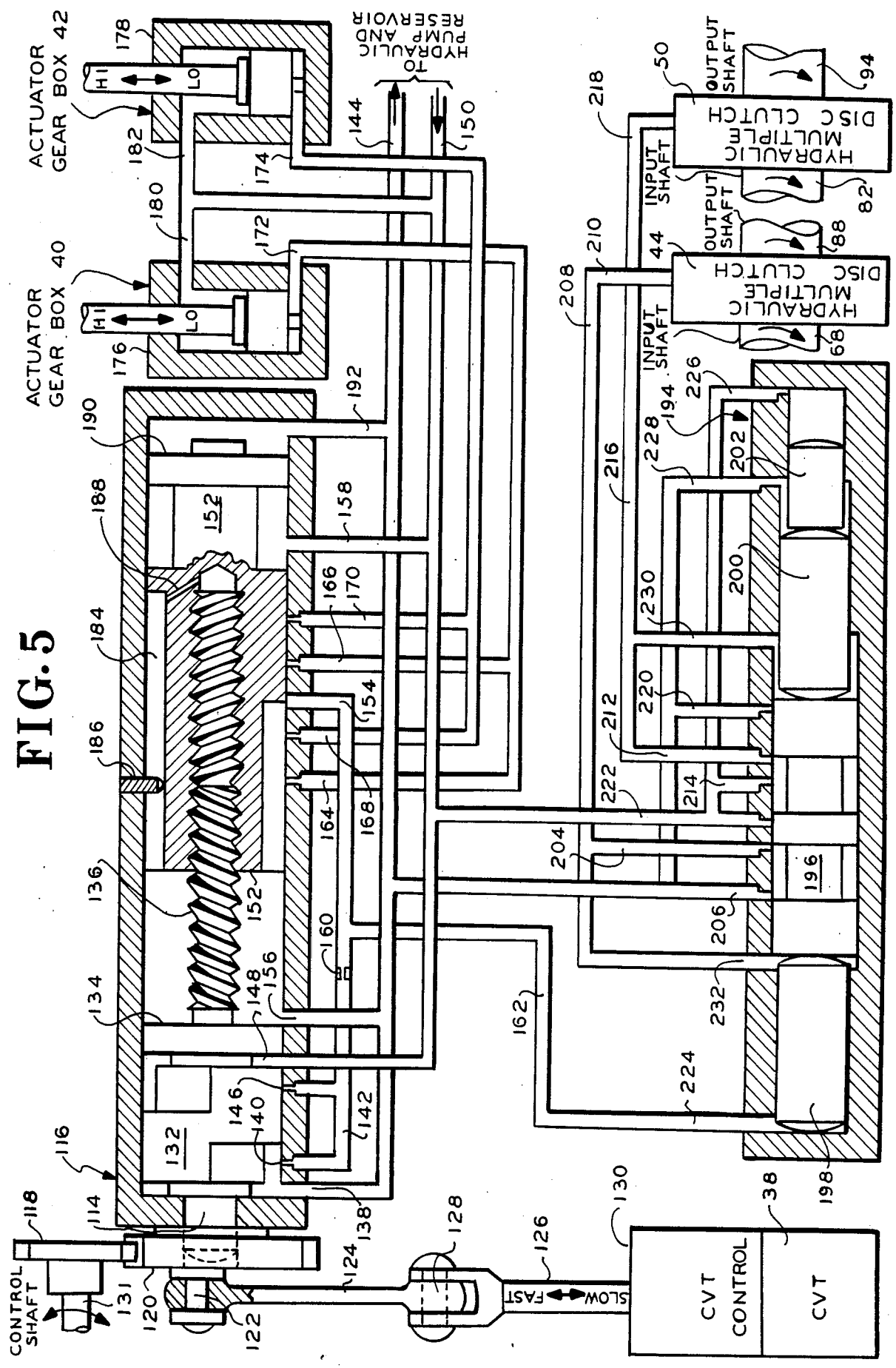
FIG. 5 is a schematic view in partial cross-section of an example of a control device that may be used to provide synchronous operation of the present invention.

Operation of the gear assisted CVT requires that the clutches and related gearshift mechanisms be operated in synchronism with each other and with the CVT in response to the input ratio command provided to the transmission from an external source, not shown. In order to achieve this synchronism, a hydraulic control system, as illustrated in FIG. 5, has been provided as a typical example. Other suitable control devices, including mechanical and electrical systems, may also be employed. As shown in FIG. 5, the overall control of the gear assisted CVT is accomplished by rotation of shaft 131 which provides control of the transmission system from the external source. Shaft 131, in turn, drives shaft 114 of clutch and actuator control valve 116 through gears 118 and 120. For the four gear ratios provided by gearshift assemblies 40, 42 of FIG. 4, rotation of shaft 114 is limited to 720°, as will be described, with 180° of rotation required for each of the four gear ratios. A pin 122 is mounted eccentrically on gear 120 causing link 124 and control rod 126, connected via pin 128, to move reciprocally as gear 120 rotates. With gear 120 at its clockwise limit, as viewed from the left end of the figure, control rod 126 is at its uppermost position. Control rod 126 is coupled to a suitable known CVT control mechanism 130. This position of control rod 126 causes the CVT to operate at the speed ratio corresponding to the lowest speed ratio of the gear assisted CVT mechanism of FIG. 4, which corresponds to the maximum CVT ratio in FIG. 5.

As gear 120 rotates through the 720° limit, control rod 126 moves downward during the first 180° rotation, upward during the second 180°, downward during the third 180° and upward during the last 180° rotation, causing the ratio of the CVT to first decrease then increase, then decrease, and finally increase, as described in connection with FIG. 4. Gear 120 drives shaft 114 on which is machined a plug valve 132, a balancing piston 134, and a threaded section 136 having multiple threads of a high axial pitch. Rotation of shaft 114 causes the plug valve 132 to connect ports 138, 140 between rotation angles of 0° and 180° and between angles 360° and 540° thereby connecting hydraulic line 142 to the fluid return line 144. Similarly, rotation of shaft 114 between the angles of 180° and 360° and between 540° and 720° causes the plug valve 132 to connect ports 146 and 148, thereby connecting hydraulic fluid line 142 to the supply line 150.

Rotation of shaft 114 causes the spool valve 152 to move axially along thread 136, with 720° of rotation of shaft 114 required to move spool valve 152 through its full axial path. This travel limit provides the previously noted rotation limit of shaft 114. At shaft rotation angles of less than 120°, spool valve 152 is near the right hand end and port 154 is connected to port 156 and thus to hydraulic return 144. Similarly, with a rotation of shaft 114 greater than 600°, spool valve 152 is near the left end and port 154 is connected to port 158 and to hydraulic supply line 150. Orifice 160 in line 142 provides a flow resistance which is high compared to that of ports 156, 158 and 154. This insures that the pressure in line 162, which is nominally equal to the return pressure between angles of 0° and 180°, will not rise significantly due to the action of the plug valve 132 as the angle of shaft 114 approaches 0° or goes to a more negative angle. This also insures that pressure in line 162, which is normally equal to the supply line pressure between angles of 600° and 720°, will not fall significantly due to the action of plug valve 132 as the angle of shaft 114 approaches or exceeds 720°. The action of plug valve 132 in conjunction with the resistance of ports 140 and 146 causes the pressure in line 162 to change monotonically between supply and return pressures (and vice versa as required) during a small rotation of shaft 114 at the required transition angles angles (180°, 360° and 540°).

The location and sizes of ports 164, 166, 168, and 170 in conjunction with the lands of spool valve 152 are such that, for the rotation angles of shaft 114 listed below, the ports are connected in accordance with the following table through ports 146 and 158:

TABLE 2

| Angle | Port 164 | Port 166 | Port 168 | Port 170 |
| --- | --- | --- | --- | --- |
| 0–210° | Return | Blocked | Return | Blocked |
| 210–240° | Return | Blocked | Partial Return | Blocked |
| 240–300° | Return | Blocked | Blocked | Blocked |
| 300–330° | Return | Blocked | Blocked | Partial Supply |
| 330–390° | Return | Blocked | Blocked | Supply |

TABLE 2-continued

| Angle | Port 164 | Port 166 | Port 168 | Port 170 |
| --- | --- | --- | --- | --- |
| 390–420° | Partial Return | Blocked | Blocked | Supply |
| 420–480° | Blocked | Blocked | Blocked | Supply |
| 480–510° | Blocked | Partial Supply | Blocked | Supply |
| 510–720° | Blocked | Supply | Blocked | Supply |

By means of this valving, pressure is applied to ports 172 and 174 of actuators 176, 178 for gearshift assemblies 40, 42, causing them to extend into the higher ratio position when supply pressure is applied. When return pressure is applied to ports 172 and/or 174, the supply pressure applied to ports 180 and/or 182 causes the actuators to retract to the lower ratio position. For equal extension and retraction forces, the actuator piston area is twice the rod area. As a result, ports 164, 166, 168 and 170 in conjunction with the respective actuator 176, 178, cause gearshift assembly 42 to shift from low to high between shaft angles of 300° to 330° and to shift gear assembly 40 from low to high between shaft angles 480° to 510° when the angle of shaft 114 is increasing. When the angle of shaft 114 decreases, gear assembly 40 shifts from high to low between shaft angles 420° and 390°, and gear assembly 42 shifts from high to low between angles 240° and 210°. The differences between the upshift and downshift angles of shaft 114 is to prevent hunting of the shift control if the transmission system should operate with shaft 114 near the gearshift angles. The selected gear ratios automatically provide the required synchronism during shifts.

Rotation of spool valve 152 is prevented by milled keyway 184 and pin 186. Drilled port 188 provides pressure relief for the bottom of the screw thread. Land 190 and balancing piston 134 in conjunction with ports 192, 158, 156 and 148 provide pressure balance so as to eliminate axial forces on stem 152 and the left end of shaft 114.

As described, the action of plug valve 132 is to provide pressure on line 162 which is low for shaft 114 angles below 180°, rises abruptly at 180° and is high between 180° and 360°, falls abruptly at 360° and is low between 360° and 540°, rises abruptly at 540° and remains high above 540°. While the transition between low and high pressure or between high and low pressure on line 162 occurs as a result of a small change of angle of shaft 114, the pressure change on line 162 is not suitable for direct control of hydraulic clutchs 44, 50. Operation of these clutches must meet several requirements. One clutch, but not both, must be engaged at all times. The turn on and turn off of each clutch must be rapid and decisive. In addition, when engagement and disengagement of the clutches occur, the disengagement of one clutch must not begin until the engagement of the other is completed. In order to meet these requirements, the bistable clutch selector valve 194 is employed.

The bistable clutch selector valve includes a spool valve 196 operated by pistons 198, 200 and 202. With spool valve 196 at the left, port 204 is connected to port 206, thereby conecting hydraulic clutch 44 to the oil return via lines 208, 210 and connecting port 212 to port 214 thereby connecting clutch 50 to the supply via lines 216, 218. Similarly, with spool valve 196 to the right, port 212 is connected to port 220, thereby connecting clutch 50 to the oil return, and connecting port 204 to port 222, thereby connecting clutch 44 to the oil supply.

As spool valve 196 moves from left to right, the ports operate to connect the clutches in the following sequence:

| Clutch 44 | Clutch 50 |
| --- | --- |
| Return | Supply |
| Blocked | Supply |
| Supply | Supply |
| Supply | Blocked |
| Supply | Return |

As spool valve 196 moves from right to left, the connections occur in the reverse sequence. Operation of the spool valve is controlled by the pressure in line 162 through port 224 acting against piston 198 and by the supply pressure in line 150 through port 226 acting against piston 202. Piston 202 pushes against piston 200, which is the same diameter as piston 198. The chamber between pistons 200 and 202 is connected to the oil return through port 228. The area of piston 202 is preferably one half the area of pistons 198 and 200. As a result, pistons 200 and 202 are equivalent, in combination, to a single piston 200 activated through port 228 by a pressure equal to one half the supply pressure, with piston 202 and port 226 being omitted. The effect of pistons 198, 200 and 202 in combination is such that when pressure in line 162 is less than one half of the supply pressure, spool valve 196 experiences a force to the left and when the pressure in line 162 is greater than one half the supply pressure, spool valve 196 is forced to the right.

Additional forces are applied to the spool valve 196 by the differential area between piston 200 and the spool valve. With spool valve 196 to the left, supply pressure is applied through ports 212 and 230 to the right side of the spool valve and return pressure is applied through ports 204 and 232 to the left side of the spool valve. This produces a force to hold the spool valve to the left. As the spool valve moves to the right, ports 204 and 232 are disconnected from the return and are connected to the supply, cancelling the leftward force produced by the supply pressure on ports 212 and 230. As the spool valve moves further to the right, ports 212 and 230 are disconnected from the supply and then connected to the return to produce a force to drive the spool valve to the right. Conversely, when spool valve 196 is on the right, moving the spool valve to the left first eliminates a force driving it to the right and then produces a force to drive it to the left.

The area of the spool valve is preferably made 25% larger than the area of pistons 198 and 200. With this area ratio and the spool valve to the left, the valve will not begin to move until the pressure on line 162 is equal to or greater than 75% of the supply pressure, due to the pressure forces on spool valve 196 driving it to the left. As the spool valve moves to the right, the pressure forces on it reverse direction, causing it to continue to move to the right until it reaches the end of the stroke. Similarly, when the spool valve is to the right, the pressure on line 162 must fall below 25% of the supply pressure before the spool valve begins to move left. As the spool valve covers and uncovers ports in moving left, it experiences progressively larger forces driving it left. As a result, the spool valve position will be either to the left or right, it cannot dwell in a mid-position at any control line pressure, and the operation of clutches 44, 50 is decisive and positive as required.

The control system described is readily adaptable to any configuration of the gear assisted CVT. The number of gearshift actuators employed is readily expandable by the addition of extra porting to the control valve 116 and by extension of the length of spool valve 152 and the threaded portion 136 as required. A more sophisticated control of the CVT than that attained with the crank 122 and linkage 124 arrangement can be achieved. For example, a heart shaped cam and follower could be employed to drive the CVT control 130 so as to linearize the response between the rotation of the control shaft and the overall speed ratio of the gear assisted CVT system.

Figure 6:
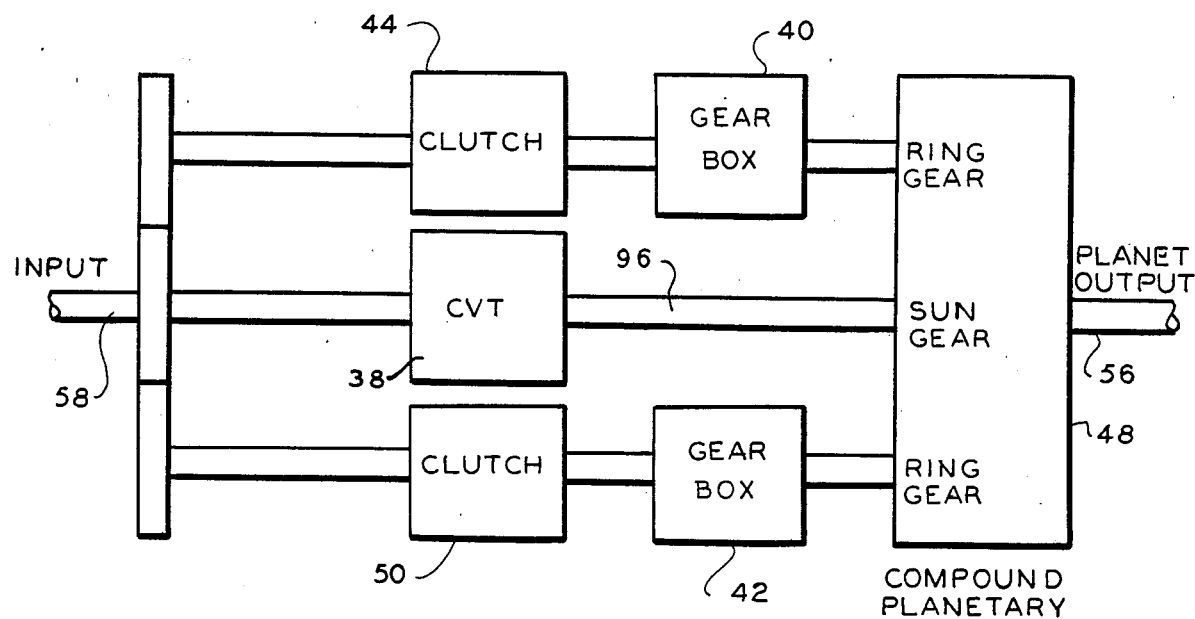
FIG. 6 is a block diagram of an alternate embodiment of the system of FIG. 4.

FIG. 6 represents an alternative embodiment in block form of the transmission system of FIG. 4 wherein the position of the clutches 44, 50 and gearshift assemblies 40, 42 are interchanged so that the clutches are coupled to the driveshaft 58 and the gear assemblies coupled to the compound planetary mechanism 48. In addition, where convenient, the two ratio changing mechanisms and respective clutches may share common elements.

Figure 7:
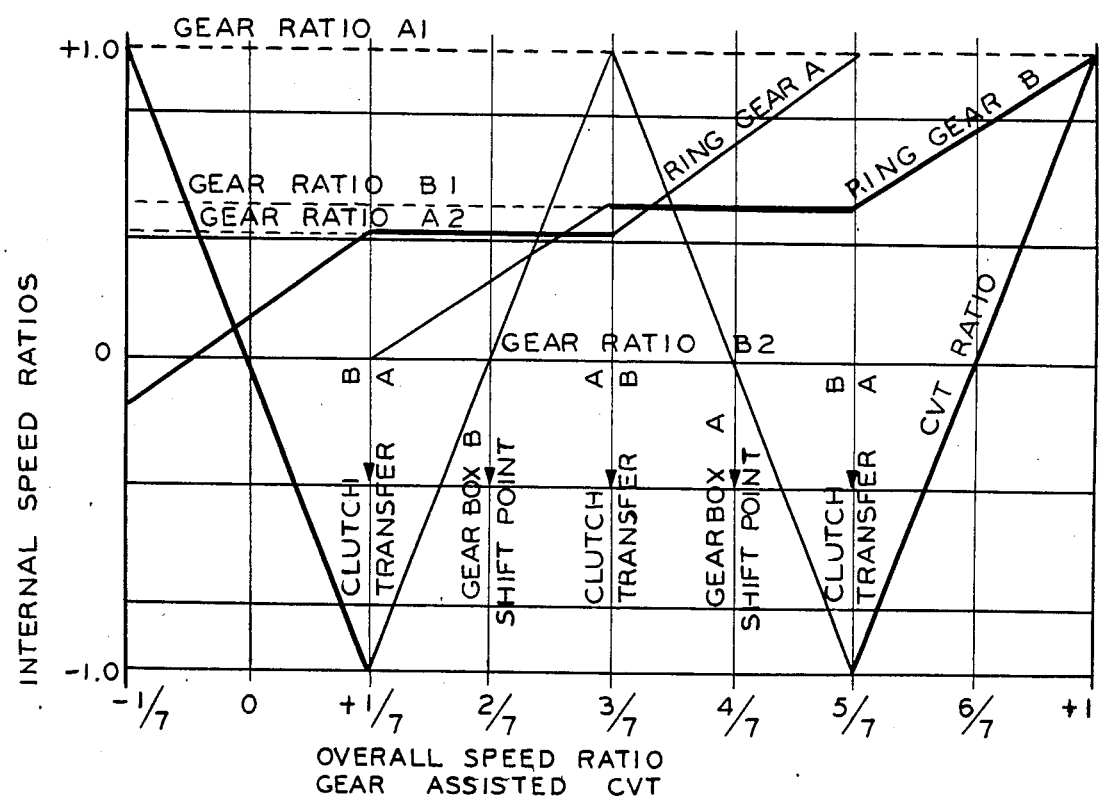
FIG. 7 is a graphical illustration of internal speed ratios versus overall speed ratios showing operating characteristics of the present invention.

FIG. 7 graphically illustrates the operation of a gear assisted CVT utilizing a practical example. It is assumed that the transmission will operate at speed ratios of $-1/7$ to $+1$ to be compatible with the requirements of an automobile having a low axle ratio for efficient operations. The CVT is considered to be a hydrostatic type having a speed ratio of $-1$ to $+1$, with four ratios being available in the gear boxes of the complete gear assisted CVT. The speed ratios of the various elements are shown as a function of the overall speed ratio. Gearboxes are designated as A and B having ratios 1 and 2 and are associated with respective clutches A and B which are coupled to input ring gears A and B of a compound planetary geartrain. Gear box B is assumed to shift at a nominal forward ratio of $+2/7$ and gearbox A shifts at a nominal forward ratio of 4/7. At these ratios, each of the gear boxes is midway through its unloaded range. Clutch B is engaged at ratios between $-1/7$ and $+1/7$ and between $+3/7$ and $+5/7$. Clutch A is engaged at ratios between $+1/7$ and $+3/7$ and between $+5/7$ and $+1$. Both clutches engage and disengage synchronously as required.

The gear assisted CVT provides an efficiency which remains high over substantially the entire speed range, compared to a CVT alone which is marginal at a maximum ratio and degrades rapidly at decreasing ratios. In automotive use, a CVT designed for normal driving would have a serious overheating problem if, for example, it were required to pull a heavy trailer up a long hill. A gear assisted CVT, on the other hand, would be virtually unaffected by such usage. In addition, the high efficiency of the gear assisted CVT over the entire speed range would allow substantially greater fuel economy. In the example shown in the graph of FIG. 7, the CVT used in conjunction with the gear assisted system would be ¼ the rating of the CVT employed independently. The cost and weight of the combined system is also much less than that of a CVT that would be required for equivalent results.

The present invention thus provides an improved transmission that combines a continuously variable transmission with a gearshifting mechanism to achieve more efficient operation with increased power handling capabilities over a full speed range. While only a single embodiment has been illustrated and described, it is apparent that other variations may be made in the particular design and configuration without departing from the scope of the invention as set forth in the appended claims.

What is claimed is:

1. A transmission system comprising:
   a plurality of power transmission paths;
   a continuously variable speed ratio transmission in one of said paths having a first input means adapted to be driven by an external prime mover, and a first output means;
   a first ratio changing mechanism having a second input means adapted to be driven by said prime mover and having a second output means;
   a second ratio changing mechanism having a third input means adapted to be driven by said prime mover and having a third output means, at least one of said ratio changing mechanisms having a plurality of selective ratios other than zero selectively engageable in a respective path;
   a compound planetary mechanism including fourth, fifth and sixth input means, and a fourth output means providing an output from said transmission system, said first output means being coupled to said fourth input means, said second output means being coupled to said fifth input means, and said third output means being coupled to said sixth input means;
   first coupling means for selectively engaging and disengaging one of said paths between said prime mover and said fifth input means, and second coupling means for selectively engaging and disengaging another of said paths between said prime mover and said sixth input means; and
   control means for disengaging one of said first and second coupling means in one of said paths when the other of said coupling means is engaged in the other of said paths, said control means providing a selection of ratios of said first and second ratio changing mechanisms such that the ratio of said continuously variable transmission can be alternately decreased and increased respectively with alternate successive ratios of said first and second ratio changing mechanisms without resetting of said continuously variable transmission ratio during the changing of said ratios.

2. The transmission system of claim 1 wherein said compound planetary mechanism is configured so that with said fifth input means driven at a given angular velocity and with said sixth input means free to rotate, an increase in the angular velocity of said fourth input means produces an increase in the angular velocity of said fourth output means, and with said sixth input means driven at a given angular velocity and said fifth input means free to rotate, an increase in the angular velocity of said fourth input means produces a decrease in the angular velocity of said fourth output means.

3. The transmission system of claim 2 wherein said first ratio changing mechanism is disposed in a first transmission path and includes first and second gear ratios selectively engaging said second output means, said second ratio changing mechanism is disposed in a second transmission path and includes third and fourth gear ratios selectively engaging said third output means, and means for selectively engaging said first and second gear ratios with said second input means upon disengagement of said first coupling means and selectively engaging said third and fourth gear ratios with said third output means upon disengagement of said second coupling means.

4. The transmission system of claim 3 wherein said first input means and second and third output means are first, second and third drive shafts, and said first and second coupling means include first and second clutches respectively coupling said second and third drive shafts to said first drive shaft, said first and second ratio changing mechanisms being coupled to respective input means of said planetary mechanism, said control means disengaging one of said clutches when the other clutch is engaged.

5. The transmission system of claim 3 wherein said first input means and said second and third output means are first, second and third drive shafts, and said first and second coupling means are first and second clutches mounted respectively on said second and third drive shafts and respectively coupling said first and second ratio changing mechanisms to respective input means of said planetary mechanism, said first and second ratio changing mechanisms including means respectively coupling said second and third drive shafts to said first drive shaft, said control means disengaging one of said clutches when the other clutch is engaged.

6. The transmission system of claim 5 wherein said means for selectively engaging said first and second gear ratios with said second drive shaft and said third and fourth gear ratios with said third drive shaft include first and second toothed sliders respectively splined to said second and third drive shafts, said control means selectively actuating said sliders to engage the selected gear ratio with said second and third drive shafts.

7. The transmission system of claim 6 wherein said first output means is a first output shaft and wherein said compound planetary mechanism fourth input means is a cetrally positioned sun gear secured to and rotatable with said first output shaft of said continuously variable transmission, said fifth input means is a first outer concentric ring gear coupled to said second drive shaft, said sixth input means is a second concentric ring gear coupled to said third drive shaft, said planetary gear assembly including a concentric planet carrier secured to and rotatable with said fourth output shaft, a first plurality of planet gears rotatingly secured on said planet carrier and meshingly engaging said centrally positioned sun gear and said first outer ring gear, a second plurality of planet gears concentrically secured to and rotatable with said first planet gears and having a smaller diameter than said first planet gears, said second planet gears meshingly engaging said second ring gear.

8. The transmission system of claim 7 wherein said sun gear, first plurality of planet gears and first outer ring gear provide a first planetary gear assembly and planetary ratio; said sun gear, second plurality of planet gears and second ring gear providing a second planetary gear assembly and planetary ratio having an inverted rotational relationship with respect to said first planetary gear assembly.

9. The transmission system of claim 8 wherein said first and second clutches include respective pairs of clutch plates on facing ends of intermediate sections of said second and third drive shafts, said control means selecting predetermined gear ratios for said drive shafts to provide synchronous rotation of respective pairs of clutch plates upon engagement and disengagement thereof.

10. The transmission system of claim 9 wherein said control means provides selection of four gearshift ratios of said first and second ratio changing mechanisms so that the ratio of said continuously variable transmission can be alternately decreased and increased with alternate successive gearshift ratios without resetting of the continuously variable transmission ratio during shifting of said gearshift ratios.

* * * * *